US007085578B2

United States Patent
Barclay et al.

(12) United States Patent
(10) Patent No.: US 7,085,578 B2
(45) Date of Patent: Aug. 1, 2006

(54) PROVISION OF LOCATION INFORMATION TO A CALL PARTY

(75) Inventors: Deborah L. Barclay, Winfield, IL (US); John J. MacNamara, Orland Park, IL (US); Ricky Lynn Willis, Yorkville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 550 days.

(21) Appl. No.: 10/027,099

(22) Filed: Dec. 20, 2001

(65) Prior Publication Data

US 2003/0119522 A1    Jun. 26, 2003

(51) Int. Cl.
*H04Q 7/20* (2006.01)

(52) U.S. Cl. ................ 455/457; 455/404.2; 455/456.3; 455/456.1; 455/566

(58) Field of Classification Search ..... 455/456.1–457, 455/157, 414.2, 413.3, 404.1, 404.2, 412.2, 455/413, 414.1, 517; 342/357.01, 357.06, 342/450
See application file for complete search history.

(56) References Cited

U.S. PATENT DOCUMENTS

| | | | |
|---|---|---|---|
| 6,185,426 B1 * | 2/2001 | Alperovich et al. ...... 455/456.1 |
| 6,212,392 B1 * | 4/2001 | Fitch et al. .............. 455/456.2 |
| 6,442,391 B1 * | 8/2002 | Johansson et al. ....... 455/456.2 |
| 6,587,691 B1 * | 7/2003 | Granstam et al. ........... 455/457 |
| 6,728,545 B1 * | 4/2004 | Belcea ..................... 455/456.2 |
| 6,748,226 B1 * | 6/2004 | Wortham ................. 455/456.6 |
| 6,766,174 B1 * | 7/2004 | Kenyon ....................... 455/457 |
| 6,882,853 B1 * | 4/2005 | Meyers ....................... 455/457 |
| 2002/0022492 A1 * | 2/2002 | Barak et al. ................. 455/457 |
| 2002/0173318 A1 * | 11/2002 | Dyer ........................... 455/456 |
| 2003/0016804 A1 * | 1/2003 | Sheha et al. ........... 379/201.06 |
| 2003/0050039 A1 * | 3/2003 | Baba et al. .................. 455/404 |

* cited by examiner

*Primary Examiner*—Eliseo Ramos-Feliciano
*Assistant Examiner*—Anthony S. Addy

(57) ABSTRACT

Apparatus and method provide location information for a calling party to a called party and/or provide a location for called party to a calling party. The information may be provided to a customer on a subscription basis or a customer may query for location information for the party at the other end of a call on an ad hoc basis (413). The customer may select the granularity (303) of the location information as well as the format (309) in which the information is sent. A party may optionally disable (403) the location ID feature so that the other person is not able to receive the party's location.

19 Claims, 3 Drawing Sheets

PROVISION OF LOCATION INFORMATION TO A CALL PARTY

FIELD OF THE INVENTION

This invention relates to communication systems, including but not limited to location information within communication systems.

BACKGROUND OF THE INVENTION

Caller ID (identification) is a known feature on wireline and wireless communication systems. In addition to normal call information, a telephone number and/or identifier of a (calling) party associated with the telephone number are sent to the called party and displayed to the called party. Caller ID features are know to work in both wireline and wireless environments.

Caller ID, however, does not always provide as much information as the called party may desire more information about the calling party to help identify who is calling and/or more information about the calling party. For example, if the called party does not recognize the name and number of the calling party, the called party may wish additional information to help identify the person.

Accordingly, there is a need for a caller ID system that provides more information to a called party than the calling party's number and identification.

SUMMARY

A method comprises the steps of sending a call from a calling party having a second location to a called party at a first location and providing at least one of the first location to the calling party and the second location to the called party.

DESCRIPTION OF A PREFERRED EMBODIMENT

The following describes an apparatus for and method of providing location information for a calling party to a called party or providing a location for called party to a calling party. The information may be provided to a customer on a subscription basis or a customer may query for location information for the party at the other end of a call on an ad hoc basis. The customer may select the granularity of the location information as well as the format in which the information is sent. A party may optionally disable the location ID feature so that the other person is not able to receive the party's location.

Figure 1:
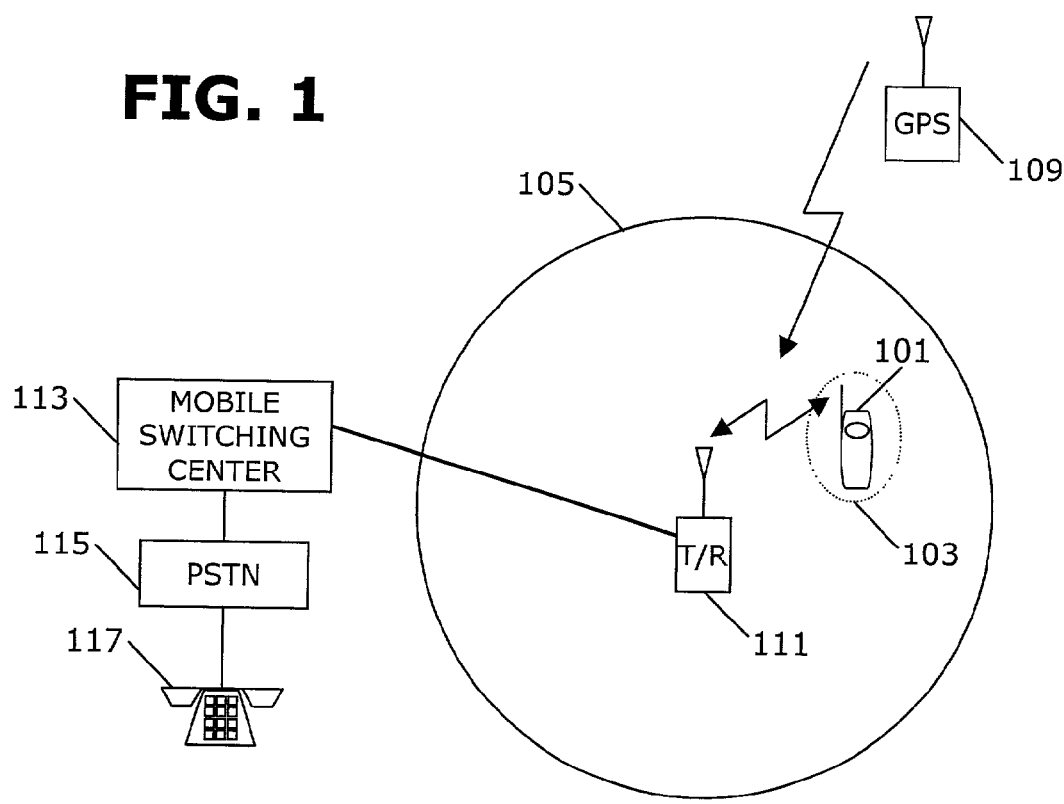
FIG. 1 is a block diagram of a communication network in accordance with the invention.

The communication network shown in FIG. 1 illustrates communications between wireless communication devices 101, such as cellular telephones, and wireline communication devices, such as standard telephones 117. Although this diagram illustrates communications between wireless and wireline devices, the present invention is applicable to any type of communication systems, including wireline only, wireless only, and any combination of the various types of wireline and wireless networks.

A wireless communication device 101, such as a mobile cellular phone, has a specific location 103 within a cell or coverage area 105 that is supported by one or more base stations or transceivers (T/R) 111 that provide wireless communications in the coverage area 105. A mobile switching center 113 operates in conjunction with the T/R 111 to interface communications between the wireless device 101 and the public-switched telephone network (PSTN) 115, which provides communications to wireline communication devices 117.

Figure 2:
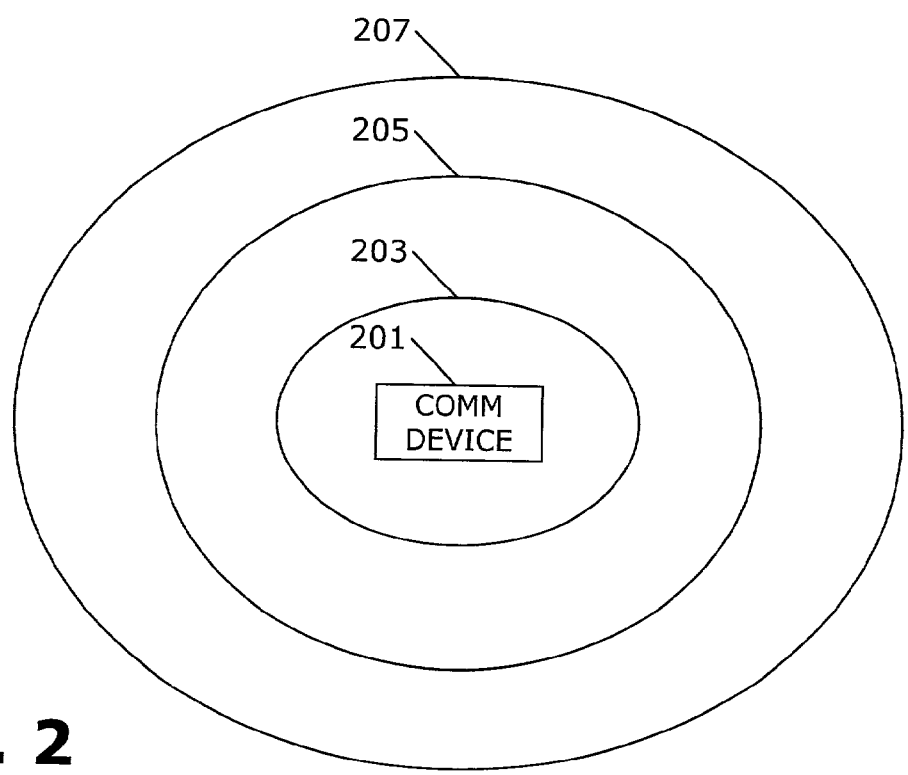
FIG. 2 is a diagram showing granularity of location information in accordance with the invention.

A diagram showing granularity of location information is shown in FIG. 2. The granularity, or degree of specificity, of the location information may be different depending on the type of network or the location of the called party. For example, as shown in FIG. 2, the communication device 201 may be located at 123 Main Street, Anytown, Ill. 12345, USA. The finest level of granularity for this information, as indicated by the center area 203, is very specific. For example, the finest granularity of location information may include a street address and city, or very specific geodetic information, such as longitude and latitude to within tenths of degrees (e.g., 123.4 degrees). A middle level of granularity is less specific than the finest level, as indicated by the second area 205. The location information is not as specific for the middle level as for the finest level. For example, the location may include a street and city, a zip code, a city and state, or geodetic information within a degree (e.g., 123 degrees). A course level of granularity is less specific than the middle level, as indicated by the outer area 207. The location information is not as specific for the course level as for the middle level. For example, the location may include a state or geodetic information within tens of degrees (e.g., 120 degrees). Although three levels of granularity of information are shown in FIG. 2, any number of granularities of location information may be utilized. Other examples of location granularities include room, floor, building name, facility name, highway, county, state, province, country, time zone, train ID, bus ID, taxi ID, and so forth.

Location information may be provided as geodetic information, such as longitude and latitude, or utilizing non-geodetic or common nomenclature, such as street addresses/names, names of businesses, city/state names, and so forth. Geodetic information may be provided by a Global Positioning System (GPS), land-based triangulation systems, and other known location determination methods. An optional feature of the present invention includes conversion of geodetic information to non-geodetic information or common nomenclature. A software look-up table or other mechanism for converting the information is utilized, such as those utilized by E911 Public Service Answering Positions, as are known in the art. Thus, a person who is not familiar with longitude and latitude will be readily able to make sense of the location information when non-geodetic information is sent.

Figure 3:
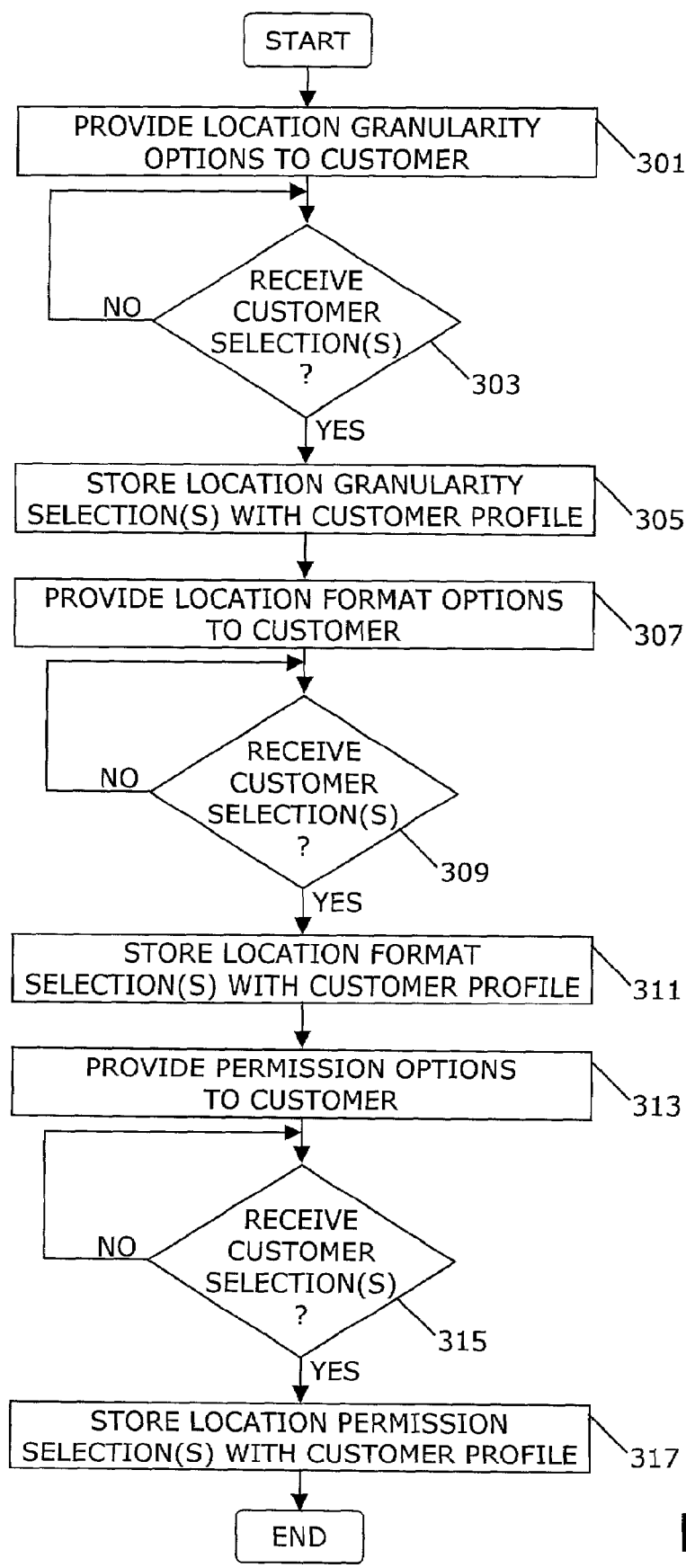
FIG. 3 is a flowchart showing a method of providing location granularity and format options to a customer in accordance with the invention.

A flowchart showing a method of providing location granularity and format options to a customer is shown in FIG. 3. At step 301, one or more location granularity options are provided to a customer. At step 303, the customer selects one of the options sends the options for receipt by the service provider. Optionally, the customer may select various different granularity settings for different parties or circumstances. For example, the customer may select a quantity of telephone numbers for which fine granularity is chosen. These numbers may be associated with close family members, such as spouse or children, business associates, or others for which specific location is important to the user. For telemarketing calls, the customer may select coarse granularity, because only the state of the call may be desired. A middle granularity level may be chosen for all other calls. At step 305, the location granularity selection(s) are stored with the customer's profile, for example, by the service provider.

At step 307, one or more location format options are provided to the customer. At step 309, the customer selects one or more of the options and sends the option(s) for receipt by the service provider. Optionally, the customer may select various different formats for different callers or circumstances. For example, the customer may select a quantity of telephone numbers for which a map is chosen (e.g., for family members or friends), a different set of numbers for which a building map is chosen (e.g., for locations of business associates in large buildings), and the remaining numbers may be displayed as text. Another option is the ability to receive directions between the location of the called party and the location of the calling party. This option may also be selected during a call. Optionally, a customer may select geodetic or non-geodetic representation of location information. At step 311, the location format selection(s) are stored with the customer's profile, for example, by the service provider.

At step 313, one or more permission options are provided to the customer. These permission options include the ability to selectively allow the customer to allow certain individuals the ability to see the customer's location information. At step 315, the customer selects one or more of the options and sends the option(s) for receipt by the service provider. Optionally, the customer may select various different permissions for different callers or circumstances. For example, the customer may select a quantity of telephone numbers for which permission is always given (e.g., for family members, friends, or emergency services such as police or fire department), a different set of numbers for which permission is always denied (e.g., for out of state numbers, telemarketing numbers, and/or specifically entered numbers, area codes, and/or exchanges), and the remaining numbers may be on a call-by-call basis where permission is requested at the time of the call. Another option is the ability to disable or enable location information to be sent for all calls. At step 317, the permission selection(s) are stored with the customer's profile, for example, by the service provider.

Figure 4:
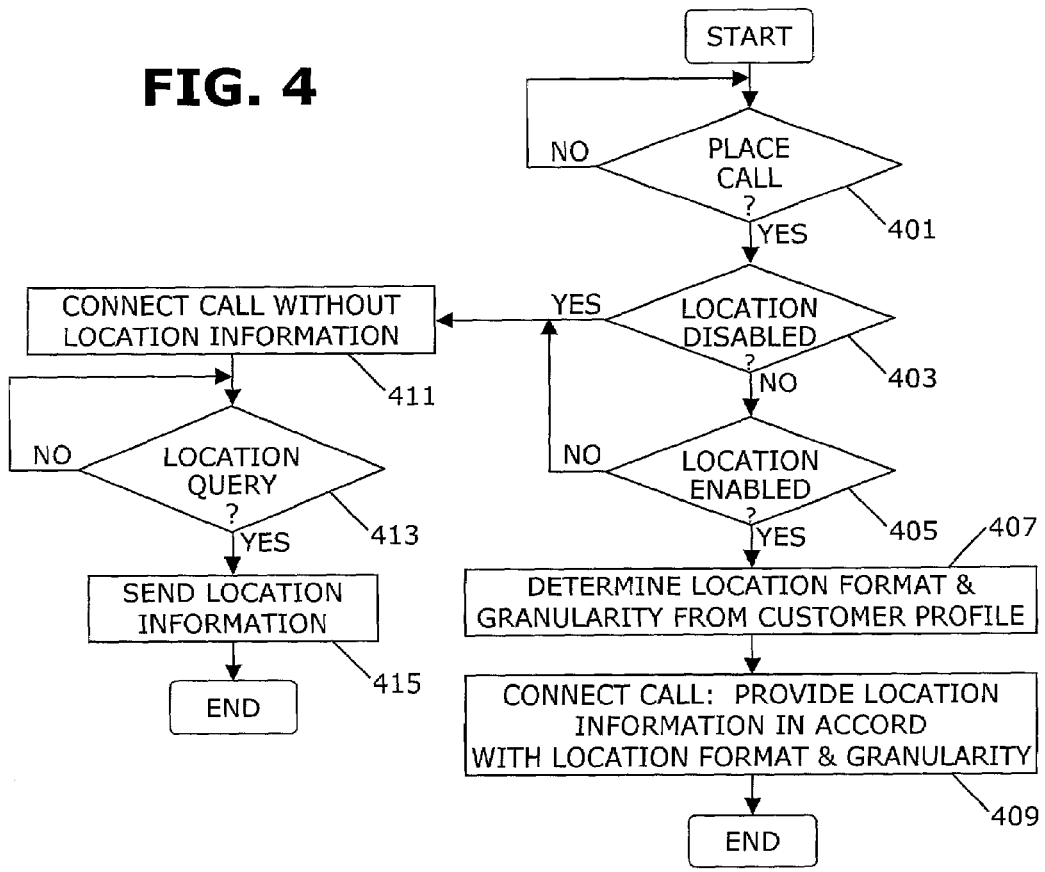
FIG. 4 is a flowchart showing a method of sending location information to a customer in accordance with the invention.

A flowchart showing a method of sending location information to a customer is shown in FIG. 4. At step 401, when a call is placed to or by a customer, it is determined at step 403 if any party has disabled the location ID provision feature. A party may disable the location provision in the same way that caller ID may be disabled. For example, a code may be entered prior to dialing a number. If, for example, *67 is used to disable caller ID, *57 may be used to disable location ID, and *77 may be used to disable caller ID and location provision features. Certain phones may be able to permanently disable location ID for safety, security, or other such concerns, such as safe houses, houses for battered women and children, and so forth. The ability of a party to restrict sending of location information does not affect the party's location from being sent to those legally entitled or required to receive such information, such as emergency personnel when 911 is called. In addition, a customer may disable the location provision according to user profile, such as via the permissions stored at step 317 of FIG. 3. Similarly, a customer may grant permission to send his/her location by entering a code on a per-call basis, either by query as entered by the customer.

If at step 403, location ID is not disabled, the process continues with step 405, where it is determined if either party to the call has enabled location ID. If location ID is enabled at step 405, e.g., permission has been granted to send location information, the location format and granularity is obtained from customer profile(s) at step 407. The calling/called party's phone number may also be needed to obtain the correct location format and granularity. At step 409, the call is connected and the location information is sent to the appropriate party/parties in accord with the selected granularity and format options from customer profile(s). In other words, location information is sent to one or both parties of the call in accord with the appropriate customer profile. After step 409, the process ends. Optionally, the process may continue with step 413, where either party may query for the other party's location to be sent.

If at step 403 location ID is disabled, or at step 405 location ID is not enabled, the process continues with step 411. Although both steps 403 and 405 are shown in FIG. 4, implementing both steps may not be necessary, depending on the design, and either step may be implemented as desired. At step 411, the call is connected without location information sent to either party. At step 413, either party may query for the other party's location, which information is sent according to profile at step 415 as long as permission is obtained/granted by the party, if so required, and the process ends.

Figure 5:
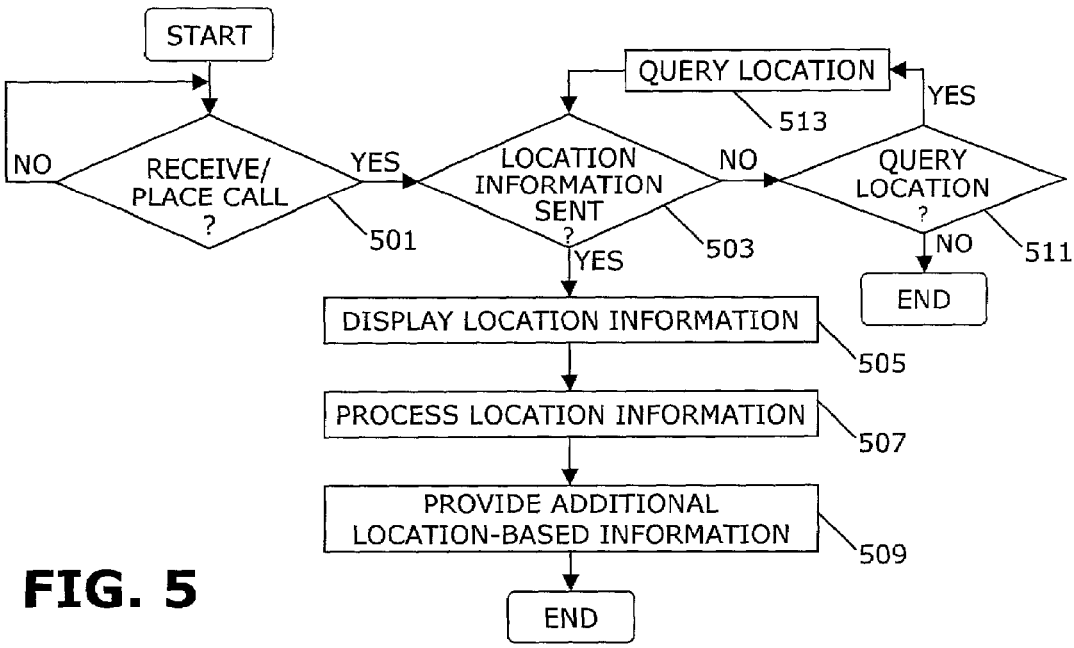
FIG. 5 is a flowchart showing a method of receiving location information for a call in accordance with the invention.

A flowchart showing a method of receiving location information for a call is shown in FIG. 5. When a customer receives or places a call within the communication system at step 501, if location information is sent at step 503 (as long as permission is granted, if so required), the process continues with step 505, where the location information is displayed to the customer according to the format selected by the customer. The other party to the call may also receive the customer's location, and the same method and features of FIG. 5 are also applicable to that party. Various options for display include, for example, display on the customer's telephone or cellular phone; display on a personal computer (PC), personal digital assistant (PDA), wireless laptop; automatic direction to a printer; and so forth. At step 507, the location information may optionally be processed further by the customer's PC, PDA, phone, or other equipment. At step 509, the processing may provide information based on the location as may be desired by the customer. Such processing may include generating a map of the calling party's location, directions between the calling party's location and the called party's location, or geographic distribution information. Geographic distribution information may be generated by a customer that uses a phone to accept voting and desires a geographic distribution according to, for example, the granularity chosen for the location information. For example, a customer may ask people to call and vote on a specific issue, and may want to know how many people voted yes in a certain area or on a certain street, and how many people voted no in the same areas. Thus, various charts of geographic distributions may be generated.

If location information is not sent at step 503, the process continues with step 511. If it desired to query the location at step 511, the process continues with step 513 where a query is made for the other party's location, the network may optionally including obtaining permission from the other party before sending the location information, and the process continues with step 503.

Although the flowcharts in FIG. 4 and FIG. 5 show a single flow, the method steps involved may be part of several different processes, and may be divided between called party and calling party as well as receiving and transmitting. The present invention may be part of a conventional network or an intelligent network. The present invention may be implemented in software, e.g., in a computer-readable signal-bearing medium comprising computer readable program code, in one or more of the many software languages and implementations known in the art.

The present invention provides a party with the location of the other party to a call. The location information may be provided to the party according to numerous granularity options and various format options. Location information may be provided for all parties to a call. Information may be provided on a subscription basis or on an ad hoc basis. A customer is able to locate a calling party without need to ask the party. For example, if a child needs to tell his or her parents where to pick him up, the parents are provided with the location when the child calls. Portability and telecommunications industry deregulation has resulted in disassociation of area code information from correlation to geographic area. Thus, area code information, used in wireless and/or wireline applications, does not correlate a communication device to a geographic region. Thus the present invention provides useful location information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   sending, to a called party at a first location, a telephone call from a calling party having a second location, and, while the call is in progress;
   selecting a granularity value from among a predetermined set of granularity values;
   selecting a location display format from among a predetermined set of location display formats;
   responsive to both the selected granularity and the selected location display format, providing location information including at least one of the first location to the calling party and the second location to the called party the location information having the selected granularity and the selected location display format.

2. The method of claim 1, further comprising the step of providing the called party with at least two options for granularity of the location.

3. The method of claim 1, wherein the second location is displayed to said called party using non-geodetic nomenclature.

4. The method of claim 1, further comprising the step of processing the second location to automatically provide information based on the second location to the called party.

5. The method of claim 4, wherein the information based on the second location is at least one of a map illustrating the second location and directions from the second location to the called party.

6. The method of claim 1, further comprising the step of at least one of the called party and the calling party querying for a location of the other party.

7. The method of claim 1, further comprising the step of sending a party's location information only when the party has given permission.

8. The method of claim 1, further comprising the step of, when the calling party has at least one of restricted location information and failed to permit sending location, inhibiting sending of location information to the called party.

9. A computer-readable medium storing computer readable program code that performs the steps of claim 1.

10. A method comprising the steps of:
    establishing a telephone call between a calling party and a user, and, while the call is in progress:
    providing the user with a selection of at least two location display formats;
    providing the user with a selection of at least two granularity values;
    based on the user's selection of location display format and granularity value, determining location information for the calling party;
    providing the location information to the user for display to the user, the location information having the selected granularity and the selected location display format.

11. The method of claim 10, wherein the location information is displayed using common nomenclature.

12. The method of claim 10, further comprising the step of processing the location information to automatically provide information based on the location information to the called party.

13. A computer-readable medium storing computer readable program code that performs the steps of claim 10.

14. The method of claim 10, further comprising the step of at least one of the called party and the calling party querying for a location of the other party.

15. The method of claim 10, further comprising the step of sending a party's location information only when the party has given permission.

16. The method of claim 10, further comprising the step of, when the calling party has at least one of restricted location information and failed to permit sending location, inhibiting sending of location information to the called party.

17. The method of claim 10, wherein the at least two location display formats include at least two of text, building map, street map, and city map.

18. A method comprising the steps of:
    placing a telephone call through at least one switching system from a first telephone that is located at a second geographic location, to a second telephone that is located at a first geographic location, and, while the call is in progress;
    selecting a granularity value from among a predetermined set of granularity values;
    selecting a location display format from among a predetermined set of location display formats;
    responsive to the selected granularity and the selected location display format, sending location information from a switching system to the second telephone that identifies the second geographic location, the location information having the selected granularity and the selected location display format, and which can be displayed on the second telephone.

19. A method comprising the steps of:
    placing a telephone call through at least one switching system from a first telephone that is located at a second geographic location, to a second telephone that is located is located at a first geographic location, and, while the call is in progress;
    selecting a granularity value from among a predetermined set of granularity values;
    selecting a location display format from among a predetermined set of location display formats;
    responsive to the selected granularity and the selected location display format, sending location information from a switching system to the first telephone that identifies the first geographic location the location information having the selected granularity and the selected location display format, and which can be displayed on the first telephone.

* * * * *